(12) United States Patent
Yang et al.

(10) Patent No.: US 9,473,877 B2
(45) Date of Patent: Oct. 18, 2016

(54) UPLINK/DOWNLINK TRANSMISSION METHOD FOR SMALL AMOUNT OF DATA, AND CORRESPONDING TERMINAL AND MOBILITY MANAGEMENT UNIT

(71) Applicant: ZTE CORPORATION, Shenzhen, Guangdong Province (CN)

(72) Inventors: Kun Yang, Shenzhen (CN); Hao Wu, Shenzhen (CN); Baoguo Xie, Shenzhen (CN); Zhijun Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 42 days.

(21) Appl. No.: 14/400,348

(22) PCT Filed: Apr. 24, 2013

(86) PCT No.: PCT/CN2013/074630
§ 371 (c)(1),
(2) Date: Nov. 11, 2014

(87) PCT Pub. No.: WO2013/166913
PCT Pub. Date: Nov. 14, 2013

(65) Prior Publication Data
US 2015/0172847 A1   Jun. 18, 2015

(30) Foreign Application Priority Data

May 11, 2012 (CN) .......................... 2012 1 0146370

(51) Int. Cl.
*H04L 1/00* (2006.01)
*H04W 4/00* (2009.01)
*H04W 4/20* (2009.01)
(Continued)

(52) U.S. Cl.
CPC ............... *H04W 4/005* (2013.01); *H04W 4/20* (2013.01); *H04W 8/02* (2013.01); *H04W 68/02* (2013.01); *H04W 88/005* (2013.01); *H04W 88/02* (2013.01)

(58) Field of Classification Search
CPC .... H04L 51/066; H04W 68/00; H04W 4/00; H04W 80/04; H04W 80/05; H04W 80/06; H04W 80/07; H04W 80/08; H04W 72/04; H04W 72/05; H04W 72/06
USPC .......................... 370/328, 329, 229, 230, 235
See application file for complete search history.

(56) References Cited

U.S. PATENT DOCUMENTS

2013/0100895 A1* 4/2013 Aghili ..................... H04W 4/00
                                                                    370/329

FOREIGN PATENT DOCUMENTS

| CN | 102238520 A | 11/2011 |
|---|---|---|
| CN | 102340754 A | 2/2012 |

(Continued)

OTHER PUBLICATIONS

Small Date Transmission via NAS Signalling, SA WG2 Meeting #85; Nokia Siemens Network, Nokia; May 16-20, 2011, Xi' An, P.R.China. S2-112574.

(Continued)

*Primary Examiner* — Dady Chery
(74) *Attorney, Agent, or Firm* — Ling Wu; Stephen Yang; Ling and Yang Intellectual Property

(57) ABSTRACT

The present embodiment discloses an uplink transmission method and apparatus for a small amount of data, and the method includes: when a terminal needs to transmit a small amount of data, transmitting an indication to a mobility management unit, the indication being used for notifying the mobility management unit that the terminal is to transmit the small amount of data; and the terminal transmitting uplink universal Non-Access Stratum (NAS) transmission signaling to the mobility management unit, and including the small amount of data needed to be transmitted in the signaling.

16 Claims, 3 Drawing Sheets

(51) Int. Cl.
*H04W 8/02* (2009.01)
*H04W 68/02* (2009.01)
*H04W 88/00* (2009.01)
*H04W 88/02* (2009.01)

(56) References Cited

FOREIGN PATENT DOCUMENTS

| | | |
|---|---|---|
| CN | 102421071 A | 4/2012 |
| WO | 2011119680 A2 | 9/2011 |

OTHER PUBLICATIONS

Online Small Date Transfer using NAS, SA WG2 Meeting #86; Hitachi, Jul. 11-15, 2011, Naantali, Finland; S2-113043.
Two solutions for Online Small Data transmission, 3GPP TSG SA WG2 Meeting #79; May 11-14, 2010, Kyoto, Japan; TD S2-102524.
Technical Specification Group Services and System Aspects;System Improvements for Machine-Type Communications (Release 11); 3GPP TR 23.888 V1.6.1 (Feb. 2012) Technical Report.

* cited by examiner

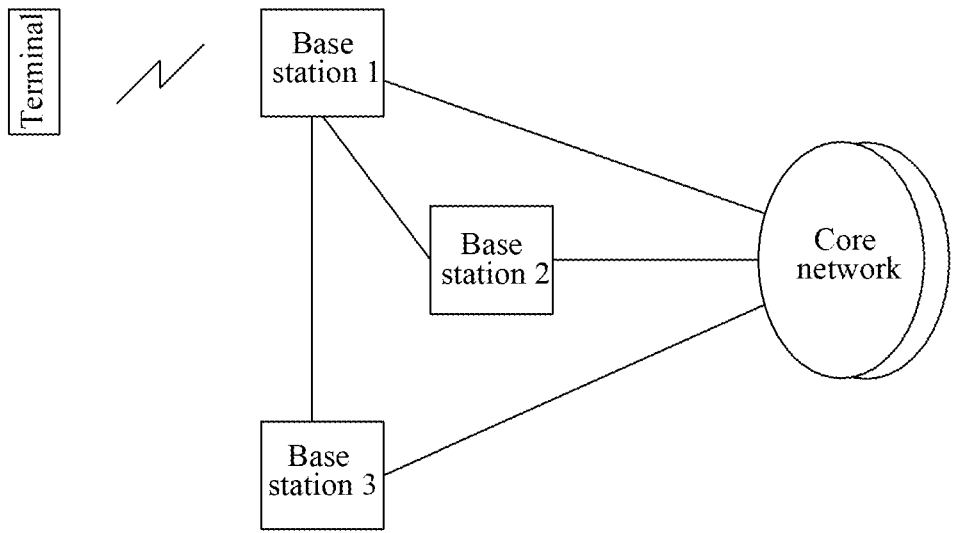

FIG. 1

```
When the terminal needs to transmit a small
amount of data, the terminal transmits an         ─110
indication to a mobility management unit, the
indication being used for notifying the mobility
management unit that the terminal is to
transmit the small amount of data
                    ↓
The terminal transmits uplink universal NAS      ─130
transmission signaling to the mobility management
unit, and includes the small amount of data
needed to be transmitted in the signaling
```

FIG. 2

```
The mobility management unit receives an         ─120
indication that a small amount of data is to be
transmitted which is transmitted by the terminal
                    ↓
The mobility management unit receives an uplink
universal NAS transmission signaling transmitted  ─140
by the terminal, and reads the small amount
of data included in the signaling
```

FIG. 3

UPLINK/DOWNLINK TRANSMISSION METHOD FOR SMALL AMOUNT OF DATA, AND CORRESPONDING TERMINAL AND MOBILITY MANAGEMENT UNIT

TECHNICAL FIELD

The present document relates to the field of terminal communications, and in particular, to a method for uplink and downlink transmission for a small amount of data, a corresponding terminal, and a mobility management unit.

BACKGROUND OF THE RELATED ART

As shown in FIG. 1, a cellular wireless communication system is mainly composed of a core network (CN for short), a radio access network (RAN for short) and a terminal. The core network is responsible for non-access stratum transactions, such as terminal location update, etc., and is an anchor of a user plane. The access network includes a base station or a base station and a base station controller, and is responsible for access stratum transactions (e.g. management of radio resources). A physical or logical connection may exist between base stations according to the practical conditions, such as a connection among a base station 1, a base station 2 and a base station 3 in FIG. 1, and each base station may be connected to one or more nodes of the core network. A terminal, i.e., a user equipment (UE for short) refers to various devices which may communicate with the cellular wireless communication network, such as mobile phones or notebook computers etc.

The mobility management unit is a unit in the core network which is responsible for managing terminal access control, location information update and handover and is responsible for controlling non-access stratum signaling from the core network to the terminal and registering the terminal to functions of the network, comprising a Mobility Management Entity (MME) or a Serving GPRS Support Node (SGSN).

A Home Subscriber Server (HSS) or a Home Location Register (HLR) is an entity in the core network which is responsible for storing subscription data, identity information, authentication information and authorization information etc. of a terminal device. According to different conditions, the HSS or HLR is available for storing identity information of users and binding information of users and terminal devices, or only storing identity information of users (the binding information of users and terminal devices may be stored by a gateway) or directly storing identity information of terminal devices. The HSS or HLR is also responsible for users' subscription database, and perform authentication and authorization etc. on user identity. A service platform may query user or terminal information from the HSS or HLR.

A Serving Gateway (S-GW) is located in the user plane, and its main function is to perform session management, routing selection and data forwarding, QoS control, accounting, and information storage etc.

A Packet Data Network Gateway (P-GW) is located in the user plane, and its main functions comprise IP address allocation, session management, PCRF selection, routing selection and data forwarding, QoS control, accounting, policy and accounting enforcement etc.

A Machine Type Communication (MTC) InterWorking Function (MTC IWF) is a connection entity between a mobile communication network and an external public network, and can achieve functions such as protocol conversion, address query, and information storage etc. The Inter-Working Function may be connected externally to an MTC server, may be connected internally to an HSS/HLR, or may be connected to mobile communication network network elements such as MME/SGSN etc.

An MTC Authentication, Authorization and Accounting (MTC AAA) function entity may retain information of the terminal accessing to the core network and provide authentication and other network services. The MTC AAA may be a RADIUS or Diameter proxy server between the P-GW and the AAA server in an external Packet Data Network (PDN).

Small data transmission refers to that the transmitted data is less than 1024 bits. Bearer resources established by the network for the terminal to transmit and receive data will not be differently treated due to a small amount of data. Therefore, if it only needs to transmit and receive such small amount of data for services of one terminal, the resources allocated by the network will have low utilization.

SUMMARY OF THE INVENTION

The embodiments of the present invention provide an uplink and downlink transmission method for a small amount of data as well as corresponding terminals and mobility management units, which can improve utilization of network resources.

The embodiments of the present invention provide an uplink transmission method for a small amount of data, comprising:

when a terminal needs to transmit a small amount of data, transmitting an indication to a mobility management unit, the indication being used for notifying the mobility management unit that the terminal is to transmit the small amount of data; and the terminal transmitting uplink universal Non-Access Stratum (NAS) transmission signaling to the mobility management unit, and including the small amount of data needed to be transmitted in the signaling.

The embodiments of the present invention further provide another uplink transmission method for a small amount of data, comprising:

a mobility management unit receiving an indication that a small amount of data is to be transmitted which is transmitted by a terminal, and preparing to receive the small amount of data; and the mobility management unit receiving uplink universal Non-Access Stratum (NAS) transmission signaling transmitted by the terminal, and reading the small amount of data included in the signaling.

Preferably, the mobility management unit preparing to receive the small amount of data comprises the mobility management unit not requesting to establish an S1 interface Application Protocol (S1-AP) context from a base station.

The embodiments of the present invention further provide a downlink transmission method for a small amount of data, comprising:

a mobility management unit transmitting a paging message to a terminal, the paging message indicating that a small amount of data needs to be transmitted to the terminal; and after the mobility management unit receives a service request initiated by the terminal, transmitting downlink universal Non-Access Stratum (NAS) transmission signaling to the terminal, and including the small amount of data needed to be transmitted in the signaling.

The embodiments of the present invention further provide a downlink transmission method for a small amount of data, comprising:

a terminal receiving a paging message transmitted by a mobility management unit, the paging message indicating that the mobility management unit needs to transmit a small amount of data to the terminal;

the terminal transmitting service request signaling to the mobility management unit, the service request signaling indicating that a small amount of data needs to be received; and the terminal receiving downlink universal Non-Access Stratum (NAS) transmission signaling transmitted by the mobility management unit, and reading the small amount of data included in the signaling.

The embodiments of the present invention further provide a terminal for achieving uplink transmission for a small amount of data, comprising a first indication module and a transmission module, wherein, the first indication module is configured to transmit an indication to a mobility management unit when the terminal needs to transmit an uplink small amount of data, the indication being used for notifying the mobility management unit that the terminal is to transmit the small amount of data; and the transmission module is configured to transmit uplink universal Non-Access Stratum (NAS) transmission signaling to the mobility management unit and include the small amount of data needed to be transmitted in the signaling after the first indication module transmits the indication.

The embodiments of the present invention further provide a terminal for achieving downlink transmission for a small amount of data, comprising a message reception module, a second indication module and a data reception module, wherein, the message reception module is configured to receive a paging message transmitted by a mobility management unit, the paging message indicating that the mobility management unit needs to transmit a small amount of data to the terminal;

the second indication module is configured to transmit service request signaling to the mobility management unit after the reception module receives the paging message, the service request signaling indicating that a small amount of data needs to be received; and the data reception module is configured to receive downlink universal Non-Access Stratum (NAS) transmission signaling transmitted by the mobility management unit and read the small amount of data included in the signaling.

The embodiments of the present invention further provide a mobility management unit for achieving uplink transmission for a small amount of data, comprising an indication reception module and a data reception module, wherein, the indication reception module is configured to receive an indication that a small amount of data is to be transmitted which is transmitted by a terminal, and the data reception module is configured to prepare to receive the small amount of data after the indication reception module receives the indication, receive uplink universal Non-Access Stratum (NAS) transmission signaling transmitted by the terminal, and read the small amount of data included in the signaling.

Preferably, the data reception module prepares to receive the small amount of data by the following way: not requesting to establish an S1 interface Application Protocol (S1-AP) context from a base station.

The embodiments of the present invention further provide a mobility management unit for achieving downlink transmission for a small amount of data, comprising a message transmission module and a data transmission module, wherein, the message transmission module is configured to transmit a paging message to a terminal, the paging message indicating that a small amount of data needs to be transmitted to the terminal; and the data transmission module is configured to transmit downlink universal Non-Access Stratum (NAS) transmission signaling to the terminal and include the small amount of data needed to be transmitted in the signaling after receiving a service request initiated by the terminal.

In consideration of improving utilization of network resources and reducing unnecessary resource allocation, the embodiments of the present invention propose a method for transmitting a small amount of data, which uses NAS signaling to transmit the small amount of data, thereby reducing network resources for bearer establishment of a user plane, and avoiding a waste of network resources.

The methods according to the embodiments of the present invention can not only be applied to normal terminals, but also can be applied to MTC terminals.

BRIEF DESCRIPTION OF DRAWINGS

FIG. 1 is a structural diagram of a cellular wireless communication system;

FIG. 2 is a flowchart of a process performed by a terminal according to embodiment one of the present invention;

FIG. 3 is a flowchart of a process performed by a mobility management unit according to embodiment one of the present invention;

PREFERRED EMBODIMENTS OF THE PRESENT INVENTION

Figure 4:
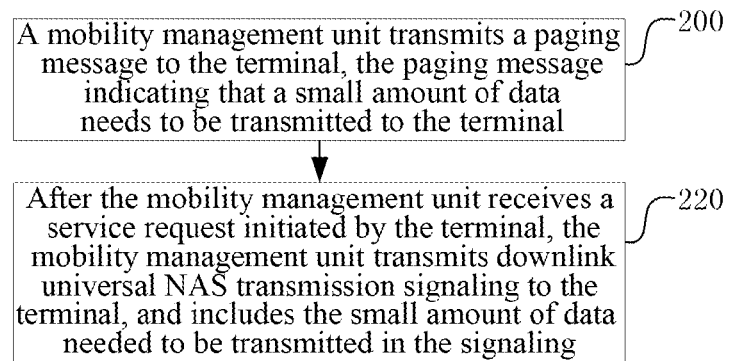
FIG. 4 is a flowchart of a process performed by a mobility management unit according to embodiment two of the present invention.

The embodiments of the present invention will be described in detail in conjunction with accompanying drawings hereinafter. It should be illustrated that without conflict, the embodiments in the application and the features of the embodiments can be randomly combined with each other.

Embodiment One

The present embodiment describes a process of uplink transmission, i.e., a process of a terminal transmitting a small amount of data to a network side, wherein, The process performed by the terminal side is as shown in FIG. 2, comprising steps 110 and 130.

in steps 110, when the terminal needs to transmit a small amount of data, the terminal transmits an indication to a mobility management unit, the indication being used for notifying the mobility management unit that the terminal is to transmit the small amount of data; and Preferably, the terminal may transmit the above indication to the mobility management unit through service request signaling. In addition to the service request signaling, the terminal may also transmit the indication using other signaling.

In step 130, the terminal transmits uplink universal Non-Access Stratum (NAS) transmission signaling to the mobility management unit, and includes the small amount of data needed to be transmitted in the signaling.

The small amount of data herein comprises data of less than 1024 bits. In some embodiments, data of 1024 bits may also be considered as a small amount of data.

The mobility management unit herein may refer to a Mobility Management Entity (MME), or may be a Serving GPRS Support Node (SGSN).

The process performed by the mobility management unit is as shown in FIG. 3, comprising steps 120 and 140.

In step 120, the mobility management unit receives an indication that a small amount of data is to be transmitted which is transmitted by the terminal, and prepares to receive the small amount of data.

The mobility management unit preparing to receive the small amount of data comprises not requesting to establish an S1 interface Application Protocol (S1-AP) context from a base station.

In other embodiments, the mobility management unit may also select to refuse receiving the small amount of data at this time.

In step 140, the mobility management unit receives an uplink universal NAS transmission signaling transmitted by the terminal, and reads the small amount of data included in the signaling.

Preferably, after the mobility management unit reads and acquires the small amount of data, the mobility management unit may also transmit the small amount of data to an application server, which may specifically be implemented through one of the following two modes:

in a first mode, the mobility management unit transmit the small amount of data to the application server through a control plane. When the terminal is an MTC terminal, specifically the mobility management unit transmits the small amount of data to the application server through an MTC InterWorking Function (MTC IWF).

For example, if the mobility management unit is an MME, the MME firstly transmits the small amount of data to the MTC IWF; and after receiving the small amount of data transmitted by the MME, the MTC IWF acquires an address of the application server from an HSS, and transmits the small amount of data to the application server.

In a second mode, the mobility management unit transmits the small amount of data to the application server through a user plane. Specifically, the mobility management unit firstly transmits the small amount of data to a serving gateway; the serving gateway transmits the small amount of data to the packet data network gateway; and the packet data network gateway then transmits the small amount of data to the application server.

The whole uplink transmission flow includes the above steps 110, 120, 130 and 140.

Embodiment Two

The present embodiment describes a process of downlink transmission, i.e., a process of a network side transmitting a small amount of data to a terminal, wherein, The process performed by the terminal side is as shown in FIG. 4, comprising steps 200 and 220.

In step 200, a mobility management unit transmits a paging message to the terminal, the paging message indicating that a small amount of data needs to be transmitted to the terminal;

the small amount of data transmitted by the mobility management unit to the terminal may be transmitted by an application server to the mobility management unit through a control plane or a user plane.

When the terminal is an MTC terminal, the process of transmission by the application server through the control plane is as follows: the application server transmits the small amount of data to the MTC IWF; after receiving the small amount of data, the MTC IWF firstly queries and acquires an address of the mobility management unit (if the mobility management unit is an MME, queries from the HSS, and if the mobility management unit is an SGSN, queries from the HSS or the HLR), and transmits the small amount of data to the mobility management unit.

The process of transmission by the application server through the user plane is as follows: the application server transmits the small amount of data to the packet data network gateway; the packet data network gateway transmits the small amount of data to the serving gateway; and the serving gateway transmits the small amount of data to the mobility management unit.

In step 220, after the mobility management unit receives a service request initiated by the terminal, the mobility management unit transmits downlink universal NAS transmission signaling to the terminal, and includes the small amount of data needed to be transmitted in the signaling.

Figure 5:
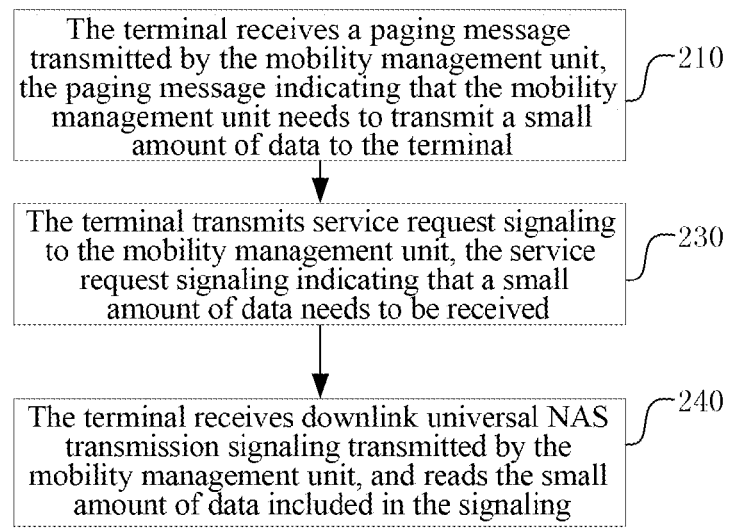
FIG. 5 is a flowchart of a process performed by a terminal according to embodiment two of the present invention.

The process performed by the mobility management unit is as shown in FIG. 5, comprising steps 210, 230 and 240.

In step 210, the terminal receives a paging message transmitted by the mobility management unit, the paging message indicating that the mobility management unit needs to transmit a small amount of data to the terminal;

in step 230, the terminal transmits service request signaling to the mobility management unit, the service request signaling indicating that a small amount of data needs to be received; and in step 240, the terminal receives downlink universal NAS transmission signaling transmitted by the mobility management unit, and reads the small amount of data included in the signaling.

The whole downlink transmission flow includes the above steps 200, 210, 220, 230 and 240.

Embodiment Three

The present embodiment describes a terminal for achieving transmission of a small amount of data, comprising a terminal capable of achieving uplink transmission of a small amount of data and a terminal capable of achieving downlink transmission of a small amount of data.

Figure 6:
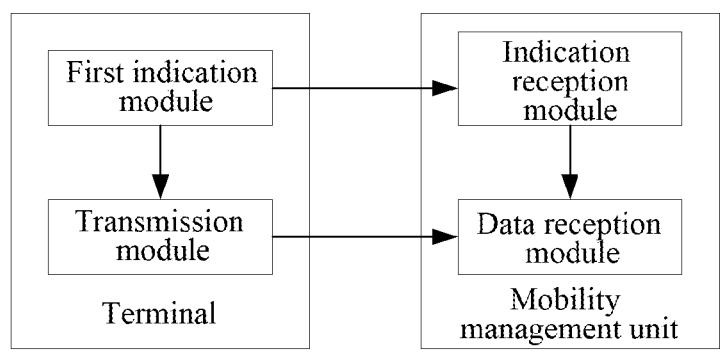
FIG. 6 is a structural diagram of a terminal and a mobility management unit implementing uplink transmission of a small amount of data.

The terminal for achieving uplink transmission of a small amount of data is as shown in FIG. 6, comprising a first indication module and a transmission module, wherein, the first indication module is configured to transmit an indication to a mobility management unit when the terminal needs to transmit an uplink small amount of data, the indication being used for notifying the mobility management unit that the terminal is to transmit the small amount of data; and the transmission module is configured to transmit uplink universal NAS transmission signaling to the mobility management unit and include the small amount of data needed to be transmitted in the signaling after the first indication module transmits the indication.

Preferably, the first indication module transmits the indication to the mobility management unit through service request signaling.

Figure 7:
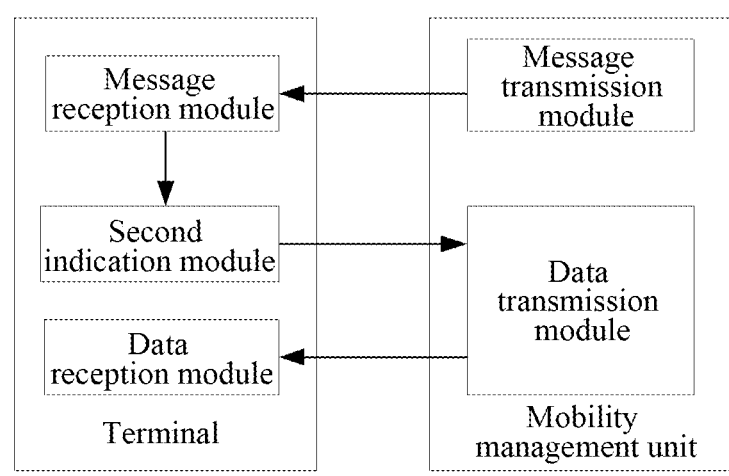
FIG. 7 is a structural diagram of a terminal and a mobility management unit implementing downlink transmission of a small amount of data.

The terminal for achieving downlink transmission of a small amount of data is as shown in FIG. 7, comprising a message reception module, a second indication module and a data reception module, wherein, the message reception module is configured to receive a paging message transmitted by a mobility management unit, the paging message indicating that the mobility management unit needs to transmit a small amount of data to the terminal;

the second indication module is configured to transmit service request signaling to the mobility management unit after the reception module receives the paging message, the service request signaling indicating that a small amount of data needs to be received; and the data reception module is configured to receive downlink universal NAS transmission signaling transmitted by the mobility management unit and read the small amount of data included in the signaling.

Embodiment Four

The present embodiment describes a mobility management unit for achieving transmission of a small amount of data, comprising a mobility management unit capable of achieving uplink transmission of a small amount of data and a mobility management unit capable of achieving downlink transmission of a small amount of data.

The mobility management unit capable of achieving uplink transmission of a small amount of data is as shown in FIG. 6, comprising an indication reception module and a data reception module, wherein, the indication reception module is configured to receive an indication that a small amount of data is to be transmitted which is transmitted by a terminal, and the data reception module is configured to prepare to receive the small amount of data after the indication reception module receives the indication, receive uplink universal NAS transmission signaling transmitted by the terminal, and read the small amount of data included in the signaling.

Preferably, the data reception module preparing to receive the small amount of data comprises: not requesting to establish an S1-AP context from a base station.

Preferably, the mobility management unit further comprises a data transmission module, configured to transmit the small amount of data to an application server through a control plane or a user plane. When the terminal is an MTC terminal, the data transmission module transmits the small amount of data to the application server through the control plane. Preferably, the data transmission module may transmit the small amount of data to the application server through an MTC IWF. The data transmission module transmitting the small amount of data to the application server through the user plane comprises: the data transmission module transmitting the small amount of data to the application server through a serving gateway and a packet data network gateway and the data reception module transmitting the small amount of data to the application server through the control plane.

The mobility management unit capable of achieving uplink transmission of a small amount of data is as shown in FIG. 7, comprising a message transmission module and a data transmission module, wherein, the message transmission module is configured to transmit a paging message to a terminal, the paging message indicating that a small amount of data needs to be transmitted to the terminal; and the data transmission module is configured to transmit downlink universal NAS transmission signaling to the terminal and include the small amount of data needed to be transmitted in the signaling after receiving a service request initiated by the terminal.

The small amount of data transmitted by the mobility management unit to the terminal is a small amount of data transmitted by an application server to the mobility management unit through a control plane or a user plane.

The present document will be described below by taking an MME as a mobility management unit, and the method when the mobility management unit is an SGSN may be performed with reference to the description.

Application Example One

In the scenario of the present example, a terminal performs uplink transmission of a small amount of data, and an MME transmits the received small amount of data to an application server through a control plane, which comprises the following steps.

In step 1, the terminal transmits an attachment request to the MME;

in step 2, after receiving the attachment request from the terminal, the MME transmits update location signaling to an HSS, the update location signaling comprising an identity of the terminal;

in step 3, after receiving the update location signaling, the HSS searches a local database for an address of a serving MTC IWF of the terminal according to the identity of the terminal included in the signaling, includes the address in update location acknowledgement and transmits it to the MME;

in step 4, the MME transmits attachment acceptance to the terminal;

in step 5, when the terminal needs to transmit a small amount of data, the terminal transmits service request signaling to the MME, the signaling comprising contents as illustrated in table 1:

TABLE 1

A format of service request signaling

| Information Elements | Remarks |
|---|---|
| Protocol identities | for identifying that the current signalling is a service request |
| Security authentication parameters | for authenticating the current signalling by a network |
| indication of a small amount of data | for indicating that the terminal needs to transmit a small amount of data |

Wherein, the terminal sets the indication of the small amount of data as "TRUE", which represents that the terminal needs to transmit a small amount of data.

In step 6, after receiving the service request signaling transmitted by the terminal, the MME reads the information in the signaling, and if the indication of the small amount of data is set as "TRUE", the MME considers that the terminal needs to transmit a small amount of data through NAS signaling, and the MME will not request to establish an S1-AP context from a base station, and at the same time, the base station will not establish a wireless data bearer for the terminal;

in step 7, the terminal transmits uplink universal NAS transmission signaling to the MME, the signaling comprising contents as illustrated in table 2:

TABLE 2

Uplink universal NAS transmission signaling

| Information Elements | Remarks |
| --- | --- |
| protocol identities | for identifying that the current signalling is uplink universal NAS transmission |
| security authentication parameters | for authenticating the current signalling by a network |
| message types | for indicating that the type of the currently carried data |
| message container | for encapsulating the data packet needed to be transmitted |

Wherein, the terminal sets the message type as "a small amount of data", and encapsulates the small amount of data to be transmitted in a message container.

in step 8, after receiving the uplink universal NAS transmission signaling transmitted by the terminal, the MME reads the small amount of data encapsulated in the signaling, and transmits the small amount of data to the MTC IWF through the T5 UPLINK signaling according to an address of the MTC IWF acquired from the HSS, the signaling comprising contents as illustrated in table 3.

TABLE 3

T5_UPLINK signaling

| Information Elements | Remarks |
| --- | --- |
| protocol identities | for identifying that the current signalling is T5_UPLINK signalling |
| terminal identity | identity of the terminal in the mobile communication network |
| message types | for indicating the type of the currently carried data |
| message container | for encapsulating data packets needed to be transmitted |

Wherein, the MME sets the terminal identity as an IMSI of the terminal, sets the message type as "a small amount of data", and encapsulates the small amount of data to be transmitted in the message container.

In step 9, after receiving a T5 UPLINK message transmitted by the MME, the MTC IWF reads the terminal identity included in the message, includes it in information query signaling and transmits the signaling to the HSS;

in step 10, the HSS searches a local database for an external identity of the terminal and an address of the application server according to the terminal identity in the information query signaling, includes them in information feedback signaling and transmits the signaling to the MTC IWF;

in step 11, after receiving the information feedback signaling, the MTC IWF reads the external identity of the terminal and the address of the application server in the signaling, includes the external identity of the terminal and a small amount of data in the Tsp_UPLINK signaling and transmits the signaling to the application server, the signaling comprising contents as illustrated in table 4:

TABLE 4

Tsp_UPLINK signaling

| Information Elements | Remarks |
| --- | --- |
| protocol identities | for identifying that the current signalling is Tsp_UPLINK signalling |
| terminal identity | identity of the terminal used outside the mobile communication network |
| message types | for indicating the type of the currently carried data |
| message container | for encapsulating data packets needed to be transmitted |

Wherein, the MTC IWF sets the terminal identity as an external identity of the terminal queried from the HSS, sets the message type as "a small amount of data", and encapsulates the small amount of data to be transmitted in the message container.

Application Example Two

In the scenario of the present example, a network side performs downlink transmission of a small amount of data, and an MME transmits the small amount of data to a terminal through a control plane, which comprises the following steps.

In step 1, an application server includes an external identity of the terminal in query request signaling and transmits the signaling to a domain name server;

in step 2, the domain name server searches a local database for an address of an MTC IWF according to the external identity of the terminal, includes it in query feedback signaling and transmits the signaling to the application server;

in step 3, the application server includes the external identity of the terminal and a small amount of data in Tsp_DOWNLINK signaling according to the address of the MTC IWF fed back by the domain name server, and transmits them to the MTC IWF, the signaling comprising contents as illustrated in table 5:

TABLE 5

Tsp_DOWNLINK signaling

| Information Elements | Remarks |
| --- | --- |
| protocol identities | for identifying that the current signalling is Tsp_DOWNLINK signalling |
| terminal identity | identity of the terminal used outside the mobile communication network |
| message types | for indicating the type of the currently carried data |
| message container | for encapsulating data packets needed to be transmitted |

Wherein, the application server sets the terminal identity as an external identity of the terminal, sets the message type as "a small amount of data", and encapsulates the small amount of data to be transmitted in the message container.

In step 4, after receiving the Tsp_DOWNLINK signaling transmitted by the application server, the MTC IWF reads information in the signaling, includes the external identity of the terminal in information query signaling and transmits the signaling to the HSS;

in step 5, the HSS searches a local database for an IMSI of the terminal and an address of a serving MME according to the external identity of the terminal in the information query signaling, includes them in the query feedback signaling, and transmits the signaling to the MTC IWF;

in step 6, the MTC IWF includes the IMSI fed back by the HSS and a small amount of data in the T5_DOWNLINK signaling according to the address of the MME fed back by the HSS, and transmits the signaling to the MME, the signaling comprising contents as illustrated in table 6:

TABLE 6

T5_DOWNLINK signaling

| Information Elements | Remarks |
| --- | --- |
| protocol identities | for identifying that the current signalling is T5_DOWNLINK signalling |
| terminal identity | identity of the terminal in the mobile communication network |
| message types | for indicating the type of the currently carried data |
| message container | for encapsulating data packets needed to be transmitted |

Wherein, the MTC IWF sets the terminal identity as an IMSI, sets the message type as "a small amount of data", and encapsulates the small amount of data to be transmitted in the message container.

In step 7, after receiving the T5_DOWNLINK signaling transmitted by the MTC IWF, the MME reads the information in the signaling, transmits a paging message to the terminal according to the identity information of the terminal, and includes an indication of a small amount of data in the paging message, the paging message comprising contents as illustrated in table 7:

TABLE 7

Paging message

| Information Elements | Remarks |
| --- | --- |
| terminal identity | identity of the terminal in the mobile communication network |
| indication of a small amount of data | for indicating whether the paging is used for transmission of a small amount of data |

Wherein, the MME sets the indication of a small amount of data as "TRUE".

The present example is described by taking an MME acquiring a small amount of data from an application server as an example, and does not exclude the MME acquiring the small amount of data by other approaches.

In step 8, after receiving the paging message, the terminal reads information in the paging message, and if a value of the indication of a small amount of data is "TRUE", the terminal transmits service request signaling to the MME, the signaling comprising contents as illustrated in table 8:

TABLE 8

Another format of service request signaling

| Information Elements | Remarks |
| --- | --- |
| protocol identities | for identifying that the current signalling is a service request |
| security authentication parameters | for authenticating the current signalling by a network |
| indication of a small amount of data | for indicating that the terminal needs to transmit a small amount of data |

Wherein, the terminal sets the indication of a small amount of data as "TRUE", to indicate the MME to transmit data by means of a small amount of data.

In step 9, after receiving the service request transmitted by the terminal, the MME reads information in the signaling, and if the indication of a small amount of data is set as "TRUE", transmits the small amount of data received from the MTC IWF to the terminal in the downlink universal NAS transmission signaling, the signaling comprising contents as illustrated in table 9:

TABLE 9

Downlink universal NAS transmission signaling

| Information Elements | Remarks |
| --- | --- |
| protocol identities | for identifying that the current signalling is downlink universal NAS transmission |
| security authentication parameters | for authenticating the current signalling by a network |
| message type | for indicating a type of currently carried data |
| message container | for encapsulating data packets needed to be transmitted |

Wherein, the MME sets the message type as "a small amount of data", and encapsulates the small amount of data to be transmitted in the message container.

Application Example Three

In the scenario of the present example, a terminal performs uplink transmission of a small amount of data, and an MME transmits the received small amount of data to an application server through a user plane, which comprises the following steps.

In step 1, the terminal transmits an attachment request to the MME;

in step 2, after receiving the attachment request from the terminal, the MME selects a serving P-GW and a serving S-GW for the terminal, and establishes a default PDN connection;

at the same time, the P-GW registers the terminal to the application server, the registration information comprising an IP address of the terminal, a port and a protocol;

in step 3, after successfully establishing the default PDN connection, the MME transmits attachment acceptance to the terminal;

Steps 4-6 are the same as steps 5-7 in the application example one.

In step 7, after receiving the uplink universal NAS transmission signaling transmitted by the terminal, the MME reads a small amount of data encapsulated in the signaling; and the MME transmits the small amount of data to the serving P-GW via a default PDN connection through an IP data packet via the serving S-GW of the terminal, the data packet comprising contents as illustrated in table 10:

TABLE 10

A format of an IP data packet

| Information Elements | Remarks |
| --- | --- |
| protocol identities | for identifying that the current data packet is IP data |
| terminal identity | identity of the terminal in the mobile communication network |
| message type | for indicating a type of currently carried data |
| message container | for encapsulating data packets needed to be transmitted |

Wherein, the MME sets a terminal identity as an IMSI, sets the message type as "a small amount of data", and encapsulates the small amount of data to be transmitted in the message container.

In step 8, after receiving the IP data packet transmitted by the S-GW, the P-GW reads the terminal identity included in the data packet, includes it in information query signaling, and transmits the signaling to an MTC AAA (Authentication, Authorization and Accounting server);

in step 9, the MTC AAA searches a local database for an external identity of the terminal according to the terminal identity in the information query signaling, includes it in information feedback signaling and transmits the signaling to the P-GW;

in step 10, after receiving the information feedback signaling, the P-GW reads the external identity of the terminal therein, searches a local database for an address of an application server registered by the terminal according to the external identity of the terminal, includes the external identity of the terminal and a small amount of data in the IP data packet and transmits it to the application server, the data comprising contents as illustrated in table 11:

TABLE 11

Another format of an IP data packet

| Information Elements | Remarks |
| --- | --- |
| protocol identities | for identifying that the current data packet is IP data |
| terminal identity | identity of the terminal used outside the mobile communication network |
| message type | for indicating a type of currently carried data |
| message container | for encapsulating data packets needed to be transmitted |

Wherein, the P-GW sets a terminal identity as the external identity of the terminal acquired from the MTC AAA, sets the message type as "a small amount of data", and encapsulates the small amount of data to be transmitted in the message container.

Application Example Four

In the scenario of the present example, a network side performs downlink transmission of a small amount of data, and an MME transmits the small amount of data to a terminal through a user plane, which comprises the following steps.

In step 1, an application server searches a local database for registration information of the terminal according to an external identity of the terminal, wherein the registration information comprises an IP port of the terminal, a port and a protocol, and the application server includes the external identity of the terminal and a small amount of data in the IP data packet according to the registration information of the terminal, and transmits it to the serving P-GW of the terminal, the data packet comprising contents as illustrated in table 11, wherein, a terminal identity is set as the external identity of the terminal, a message type is set as "a small amount of data", and the small amount of data to be transmitted is encapsulated in a message container;

in step 2, after receiving the IP data packet transmitted by the application server, the P-GW reads the information in the data packet, includes the external identity of the terminal in information query signaling, and transmits the signaling to the MAC AAA;

in step 3, the MTC AAA searches a local database for an IMSI of the terminal according to the external identity of the terminal in the information query signaling, includes it in query feedback signaling, and transmits the signaling to the P-GW;

in step 4, the P-GW includes the IMSI fed back by the MTC AAA and the small amount of data in an IP data packet and transmits it to a serving MME via a serving S-GW of the terminal through a default PDN connection, the signaling comprising contents as illustrated in table 10, wherein, a terminal identity is set as an IMSI, a message type is set as "a small amount of data", and the small amount of data to be transmitted is encapsulated in a message container;

in step 5, after receiving the IP data packet transmitted by the S-GW, the MME reads information in the data packet, transmits a paging message to the terminal according to identity information of the terminal, and includes an indication of a small amount of data in the paging message, the paging message comprising contents as illustrated in table 7, wherein, the indication of a small amount of data is set as "TRUE";

in step 6, after receiving the paging message, the terminal reads information in the paging message, and if a value of the indication of a small amount of data is "TRUE", the terminal transmits service request signaling to the MME, the signaling comprising contents as illustrated in table 8, wherein, the indication of a small amount of data is set as "TRUE";

in step 7, after receiving the service request transmitted by the terminal, the MME reads information in the signaling, and if an indication of a small amount of data is set as "TRUE", the MME transmits the small amount of data received from S-GW to the terminal in downlink universal NAS transmission signaling, the signaling comprising contents as illustrated in table 8, wherein, the message type is set as "a small amount of data", and the small amount of data to be transmitted is encapsulated in the message container.

A person having ordinary skill in the art can understand that all or a part of steps in the above method can be implemented by programs instructing related hardware, and the programs can be stored in a computer readable storage medium, such as a read-only memory, disk or disc etc. Alternatively, all or a part of steps in the above embodiments can also be implemented by one or more integrated circuits. Accordingly, each module/unit in the above embodiments can be implemented in a form of hardware, or can also be implemented in a form of software functional module. The present document is not limited to any particular form of a combination of hardware and software.

Of course, the present document can have a plurality of other embodiments. Without departing from the spirit and substance of the present document, those skilled in the art can make various corresponding changes and variations according to the present document, and all these corresponding changes and variations should belong to the protection scope of the appended claims in the present document.

INDUSTRIAL APPLICABILITY

In the solution according to embodiments of the present invention, NAS signaling is used to transmit a small amount of data, thereby reducing network resources for bearer establishment of a user plane, and avoiding a waste of network resources.

What is claimed is:

1. An uplink transmission method for a small amount of data, comprising:

when a terminal needs to transmit a small amount of data, transmitting an indication to a mobility management unit, the indication being used for notifying the mobility management unit that the terminal is to transmit the small amount of data; and the terminal transmitting uplink universal Non-Access Stratum (NAS) transmission signaling to the mobility management unit, and including the small amount of data needed to be transmitted in the signaling;

wherein after reading the small amount of data included in the signaling, the mobility management unit transmits the small amount of data to an application server through a control plane or a user plane; wherein the terminal is a Machine Type Communication (MTC) terminal, and the mobility management unit transmitting the small amount of data to the application server through the control plane comprises: the mobility management unit transmitting the small amount of data to the application server through an MTC InterWorking Function (MTC IWF);

the mobility management unit transmitting the small amount of data to the application server through the user plane comprises: the mobility management unit firstly transmitting the small amount of data to a serving gateway; the serving gateway transmitting the small amount of data to a packet data network gateway; and the packet data network gateway then transmitting the small amount of data to the application server.

2. The method according to claim 1, wherein, the terminal transmitting the indication to the mobility management unit comprises the terminal transmitting the indication to the mobility management unit through service request signaling.

3. The method according to claim 1, wherein, the small amount of data comprises data of less than 1024 bits.

4. The method according to claim 1, wherein, the mobility management unit comprises a Mobility Management Entity (MME) or a Serving GPRS Support Node (SGSN).

5. An uplink transmission method for a small amount of data, comprising:

a mobility management unit receiving an indication transmitted by a terminal that a small amount of data is to be transmitted, and preparing to receive the small amount of data; and the mobility management unit receiving uplink universal Non-Access Stratum (NAS) transmission signaling transmitted by the terminal, and reading the small amount of data included in the signaling;

wherein after reading the small amount of data included in the signaling, the mobility management unit transmits the small amount of data to an application server through a control plane or a user plane; wherein the terminal is a Machine Type Communication (MTC) terminal, and the mobility management unit transmitting the small amount of data to the application server through the control plane comprises: the mobility management unit transmitting the small amount of data to the application server through an MTC InterWorking Function (MTC IWF);

the mobility management unit transmitting the small amount of data to the application server through the user plane comprises: the mobility management unit firstly transmitting the small amount of data to a serving gateway; the serving gateway transmitting the small amount of data to a packet data network gateway; and the packet data network gateway then transmitting the small amount of data to the application server.

6. The method according to claim 5, wherein, the mobility management unit preparing to receive the small amount of data comprises:

the mobility management unit not requesting to establish an S1 interface Application Protocol (S1-AP) context from a base station.

7. The method according to claim 5, wherein, the mobility management unit comprises a Mobility Management Entity (MME) or a Serving GPRS Support Node (SGSN).

8. A downlink transmission method for a small amount of data, comprising:

a mobility management unit transmitting a paging message to a terminal, the paging message indicating that a small amount of data needs to be transmitted to the terminal; and after receiving a service request initiated by the terminal, the mobility management unit transmitting downlink universal Non-Access Stratum (NAS) transmission signaling to the terminal, and including the small amount of data needed to be transmitted in the signaling;

wherein the small amount of data transmitted by the mobility management unit to the terminal is a small amount of data transmitted by an application server to the mobility management unit through a control plane or a user plane; wherein the terminal is a Machine Type Communication (MTC) terminal, and the application server transmitting the small amount of data to the mobility management unit through the control plane comprises: the application server transmitting the small amount of data to the mobility management unit through an MTC InterWorking Function (MTC IWF);

the application server transmitting the small amount of data to the mobility management unit through the user plane comprises: the application server firstly transmitting the small amount of data to a packet data network gateway, the packet data network gateway transmitting the small amount of data to a serving gateway, and the serving gateway then transmitting the small amount of data to the mobility management unit.

9. The method according to claim 8, wherein, the small amount of data comprises data of less than 1024 bits.

10. The method according to claim 8, wherein, the mobility management unit comprises a Mobility Management Entity (MME) or a Serving GPRS Support Node (SGSN).

11. A downlink transmission method for a small amount of data, comprising:

a terminal receiving a paging message transmitted by a mobility management unit, the paging message indicating that the mobility management unit needs to transmit a small amount of data to the terminal;

the terminal transmitting service request signaling to the mobility management unit, the service request signaling indicating that the small amount of data needs to be received; and the terminal receiving downlink universal Non-Access Stratum (NAS) transmission signaling transmitted by the mobility management unit, and reading the small amount of data included in the signaling;

wherein the small amount of data transmitted by the mobility management unit to the terminal is a small amount of data transmitted by an application server to the mobility management unit through a control plane or a user plane; wherein the terminal is a Machine Type Communication (MTC) terminal, and the application server transmitting the small amount of data to the mobility management unit through the control plane comprises: the application server transmitting the small amount of data to the mobility management unit through an MTC InterWorking Function (MTC IWF);

the application server transmitting the small amount of data to the mobility management unit through the user plane comprises: the application server firstly transmitting the small amount of data to a packet data network gateway, the packet data network gateway transmitting the small amount of data to a serving gateway, and the serving gateway then transmitting the small amount of data to the mobility management unit.

12. The method according to claim 11, wherein, the small amount of data comprises data of less than 1024 bits.

13. The method according to claim 11, wherein, the mobility management unit comprises a Mobility Management Entity (MME) or a Serving GPRS Support Node (SGSN).

14. A terminal for achieving uplink transmission of a small amount of data, comprising hardware performing instructions stored in a non-transitory computer readable medium which executes steps in a first indication module and a transmission module, wherein, the first indication module is configured to transmit an indication to a mobility management unit when the terminal needs to transmit a small amount of data, the indication being used for notifying the mobility management unit that the terminal is to transmit the small amount of data; and the transmission module is configured to, after the first indication module transmits the indication, transmit uplink universal Non-Access Stratum (NAS) transmission signaling to the mobility management unit and include the small amount of data needed to be transmitted in the signaling;

wherein after reading the small amount of data included in the signaling, the mobility management unit transmits the small amount of data to an application server through a control plane or a user plane; wherein the terminal is a Machine Type Communication (MTC) terminal, and the mobility management unit transmitting the small amount of data to the application server through the control plane comprises: the mobility management unit transmitting the small amount of data to the application server through an MTC InterWorking Function (MTC IWF);

the mobility management unit transmitting the small amount of data to the application server through the user plane comprises: the mobility management unit firstly transmitting the small amount of data to a serving gateway; the serving gateway transmitting the small amount of data to a packet data network gateway; and the packet data network gateway then transmitting the small amount of data to the application server.

15. The terminal according to claim 14, wherein, the first indication module is configured to transmit the indication to the mobility management unit through service request signaling.

16. A terminal for achieving downlink transmission of a small amount of data, comprising hardware performing instructions stored in a non-transitory computer readable medium which executes steps in a message reception module, a second indication module and a data reception module, wherein, the message reception module is configured to receive a paging message transmitted by a mobility management unit, the paging message indicating that the mobility management unit needs to transmit a small amount of data to the terminal;

the second indication module is configured to, after the reception module receives the paging message, transmit service request signaling to the mobility management unit, the service request signaling indicating that the small amount of data needs to be received; and the data reception module is configured to receive downlink universal Non-Access Stratum (NAS) transmission signaling transmitted by the mobility management unit and read the small amount of data included in the signaling;

wherein the small amount of data transmitted by the mobility management unit to the terminal is a small amount of data transmitted by an application server to the mobility management unit through a control plane or a user plane; wherein the terminal is a Machine Type Communication (MTC) terminal, and the application server transmitting the small amount of data to the mobility management unit through the control plane comprises: the application server transmitting the small amount of data to the mobility management unit through an MTC InterWorking Function (MTC IWF);

the application server transmitting the small amount of data to the mobility management unit through the user plane comprises: the application server firstly transmitting the small amount of data to a packet data network gateway, the packet data network gateway transmitting the small amount of data to a serving gateway, and the serving gateway then transmitting the small amount of data to the mobility management unit.

* * * * *